(12) United States Patent
Pallon

(10) Patent No.: US 9,453,349 B2
(45) Date of Patent: Sep. 27, 2016

(54) STONE-WOOD COMPOSITE BASE ENGINEERED FLOORING

(75) Inventor: Mondo Pallon, New York, NY (US)

(73) Assignee: FINISH SYSTEMS INTERNATIONAL, LLC, Danbury, CT (US)

( * ) Notice: Subject to any disclaimer, the term of this patent is extended or adjusted under 35 U.S.C. 154(b) by 585 days.

(21) Appl. No.: 13/882,934

(22) PCT Filed: Oct. 31, 2011

(86) PCT No.: PCT/US2011/058611
§ 371 (c)(1),
(2), (4) Date: Sep. 10, 2013

(87) PCT Pub. No.: WO2012/061300
PCT Pub. Date: May 10, 2012

(65) Prior Publication Data
US 2014/0134402 A1   May 15, 2014

Related U.S. Application Data

(60) Provisional application No. 61/456,110, filed on Nov. 1, 2010.

(30) Foreign Application Priority Data

Nov. 19, 2010   (AU) ................................. 2010246330

(51) Int. Cl.
*E04F 15/04* (2006.01)
*C04B 28/32* (2006.01)
(Continued)

(52) U.S. Cl.
CPC ............ *E04F 15/042* (2013.01); *B32B 9/002* (2013.01); *B32B 9/042* (2013.01); *B32B 21/14* (2013.01);
(Continued)

(58) Field of Classification Search
CPC ........................... Y10T 442/153; C04B 28/32
USPC ...................... 442/32; 106/685–687
See application file for complete search history.

(56) References Cited

U.S. PATENT DOCUMENTS 1,976,190 A * 10/1934 Pfaff ....................... C04B 28/32
                                                                    106/687
2,383,609 A *  8/1945 MacDonald ............ C04B 28/30
                                                                    106/669

(Continued)

FOREIGN PATENT DOCUMENTS

CN        1225345 A  *  8/1999  ............. C04B 28/32
CN     201192869 Y  *  2/2009

(Continued)

OTHER PUBLICATIONS

International Search Report for PCT/US2011/058611, Completed by the U.S. Patent and Trademark Office on Mar. 6, 2012, 3 Pages.

(Continued)

*Primary Examiner* — Aaron Austin
*Assistant Examiner* — Zheren J Yang
(74) *Attorney, Agent, or Firm* — Brooks Kushman P.C.

(57) ABSTRACT

A stone-wood composite base engineered wood flooring having a composite base layer in which at least one mesh layer is embedded. The composite base layer consists essentially of approximately 40% to approximately 50% MgO, approximately 20% to approximately 45% $MgCl_2$, approximately 9% wood powder, approximately 2.5% fiberglass mesh, approximately 0.5% $Fe_2O_3$, approximately 0.5% $H_3PO_4$, and approximately 0.5% $FeSO_4$. Adhered to the base layer is a wood veneer layer. Interlocking design such as tongue-and-groove is provided on at least two sides of the engineered flooring. The wood veneer layer of the engineered wood flooring has improved fireproof performance, waterproof performance and moisture-proof performance. When the pieces of flooring are bonded to either each other or the floor, undesired warping of joints is consequently minimized.

29 Claims, 1 Drawing Sheet

(51) Int. Cl.
  *B32B 21/14* (2006.01)
  *B32B 9/00* (2006.01)
  *B32B 9/04* (2006.01)
  *E04F 15/02* (2006.01)
  *B32B 17/06* (2006.01)
  *B32B 21/04* (2006.01)

(52) U.S. Cl.
  CPC ......... *C04B 28/32* (2013.01); *E04F 15/02038* (2013.01); *B32B 17/062* (2013.01); *B32B 21/042* (2013.01); *B32B 2262/101* (2013.01); *B32B 2471/00* (2013.01); *Y10T 428/24488* (2015.01); *Y10T 428/24967* (2015.01); *Y10T 442/153* (2015.04); *Y10T 442/174* (2015.04)

(56) References Cited

U.S. PATENT DOCUMENTS

| | | | | |
|---|---|---|---|---|
| 2,702,753 A * | 2/1955 | Dickey | ............ | C04B 28/30 106/661 |
| 2,939,799 A * | 6/1960 | Chisholm | ............ | C04B 28/32 106/687 |
| 3,788,870 A * | 1/1974 | Verth et al. | ............ | C04B 28/32 106/164.5 |
| 4,419,196 A * | 12/1983 | Beckerick | ............ | C04B 28/32 106/286.6 |
| 4,572,862 A * | 2/1986 | Ellis | ............ | C04B 28/02 106/686 |
| 4,673,697 A * | 6/1987 | Rowley | ............ | C04B 28/32 106/15.05 |
| 4,855,177 A * | 8/1989 | Leis | ............ | B28D 1/003 428/141 |
| 5,049,197 A * | 9/1991 | Brown | ............ | C04B 28/32 106/685 |
| 5,130,184 A * | 7/1992 | Ellis | ............ | C04B 28/30 106/18.12 |
| 5,217,766 A * | 6/1993 | Flonc | ............ | B29B 11/16 156/222 |
| 6,017,830 A * | 1/2000 | Brown | ............ | B44C 5/04 428/141 |
| 6,395,084 B1 * | 5/2002 | Priest | ............ | B82Y 30/00 106/801 |
| 6,995,098 B2 * | 2/2006 | McGrady | ............ | B28B 19/0092 428/121 |
| 2004/0127614 A1 | 7/2004 | Jiang et al. | | |
| 2004/0224584 A1 * | 11/2004 | Broadway | ............ | B32B 3/266 442/38 |
| 2004/0265555 A1 * | 12/2004 | Tang | ............ | B32B 5/02 428/292.1 |
| 2005/0066622 A1 * | 3/2005 | Lee | ............ | C03C 13/06 52/782.1 |
| 2005/0233657 A1 * | 10/2005 | Grove | ............ | B32B 13/14 442/43 |
| 2007/0017418 A1 * | 1/2007 | Dennis | ............ | C04B 28/32 106/685 |
| 2007/0292653 A1 * | 12/2007 | Feigin | ............ | B32B 13/14 428/70 |
| 2008/0073808 A1 * | 3/2008 | Miller | ............ | B28B 23/0006 264/86 |
| 2008/0257222 A1 | 10/2008 | Wallner | | |
| 2008/0314296 A1 * | 12/2008 | Wisenbaker, Jr. | ...... | B27N 7/005 106/801 |
| 2009/0011279 A1 * | 1/2009 | Wisenbaker, Jr. | ...... | B32B 13/14 428/702 |
| 2009/0133361 A1 * | 5/2009 | Vera | ............ | B32B 13/02 52/794.1 |
| 2009/0170977 A1 * | 7/2009 | Wang | ............ | B09B 3/0025 524/2 |
| 2010/0077939 A1 * | 4/2010 | Trout | ............ | C04B 28/32 106/687 |
| 2010/0084085 A1 * | 4/2010 | Lin | ............ | B28B 7/007 156/250 |
| 2010/0119857 A1 | 5/2010 | Johnson et al. | | |
| 2010/0186337 A1 * | 7/2010 | Barretto | ............ | B32B 3/06 52/588.1 |
| 2010/0222457 A1 * | 9/2010 | Wallner | ............ | C04B 28/30 524/4 |
| 2010/0258033 A1 | 10/2010 | Yang et al. | | |
| 2010/0297411 A1 * | 11/2010 | Tsai | ............ | B32B 9/02 428/213 |
| 2010/0300032 A1 * | 12/2010 | Kang | ............ | B32B 3/06 52/612 |
| 2010/0310893 A1 * | 12/2010 | Derbyshire | ............ | B32B 21/02 428/528 |
| 2011/0027566 A1 * | 2/2011 | Lee | ............ | E04C 2/26 428/220 |
| 2011/0073009 A1 * | 3/2011 | Man | ............ | C04B 28/32 106/204.01 |
| 2011/0088597 A1 * | 4/2011 | Wu | ............ | C04B 28/32 106/686 |
| 2011/0089387 A1 * | 4/2011 | Berry | ............ | C04B 20/10 252/602 |
| 2011/0183558 A1 * | 7/2011 | Ilfrey | ............ | C04B 28/04 442/1 |
| 2011/0258964 A1 * | 10/2011 | Wu | ............ | E04B 1/14 52/791.1 |
| 2012/0110945 A1 * | 5/2012 | Hoang | ............ | C04B 20/0064 52/596 |
| 2012/0189819 A1 * | 7/2012 | Chang | ............ | B32B 3/30 428/172 |
| 2013/0227909 A1 * | 9/2013 | Hutchinson | ............ | C08G 18/3256 52/741.1 |

FOREIGN PATENT DOCUMENTS

| | | | |
|---|---|---|---|
| CN | 101386517 A | | 3/2009 |
| CN | 101812894 A | * | 8/2010 |
| JP | 10-299232 A | | 11/1998 |
| JP | 2003-520749 A | | 7/2003 |
| JP | 2003-529474 A | | 10/2003 |
| JP | 2007-146484 A | | 6/2007 |
| JP | 2008-133717 A | | 6/2008 |
| JP | 2009-504545 A | | 2/2009 |
| JP | 2010-001627 A | | 1/2010 |
| JP | 2010-048004 A | | 3/2010 |
| WO | 01/55049 A1 | | 8/2001 |
| WO | 01/74605 A2 | | 10/2001 |
| WO | 2007/019612 A1 | | 2/2007 |
| WO | 2008057390 | | 5/2008 |
| WO | 2009120045 | | 10/2009 |

OTHER PUBLICATIONS

Chinese "First" Office Action, Dated Aug. 8, 2014 (No English Translation available).
Chinese "Second" Office Action, Dated Jan. 15, 2015 with English Translation.
Japanese Office Action (to Application No. 2013-536909) dated Sep. 1, 2015, No English Translation, 4 pages.

* cited by examiner

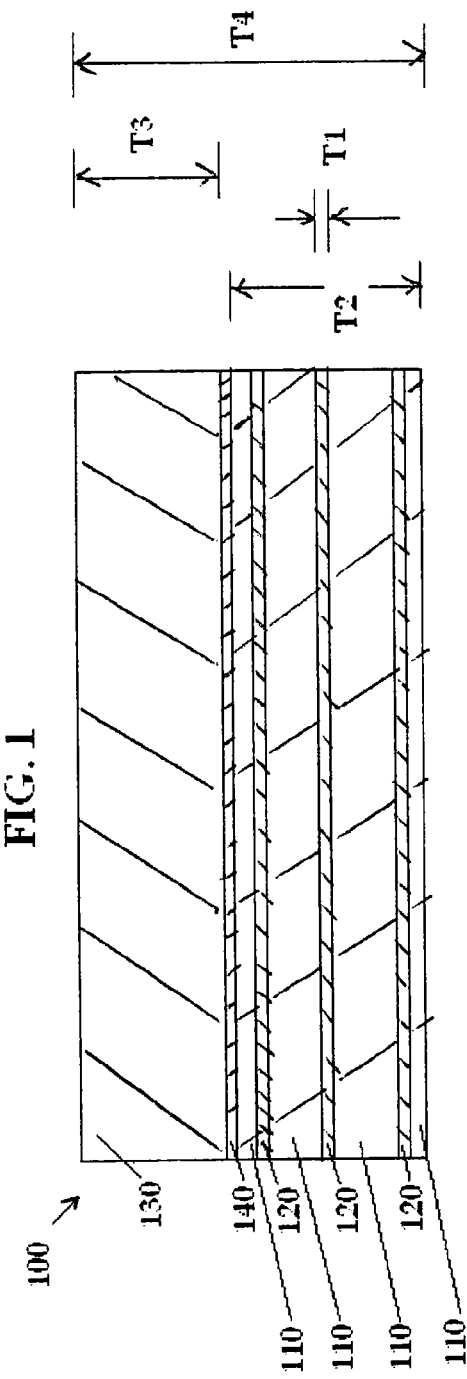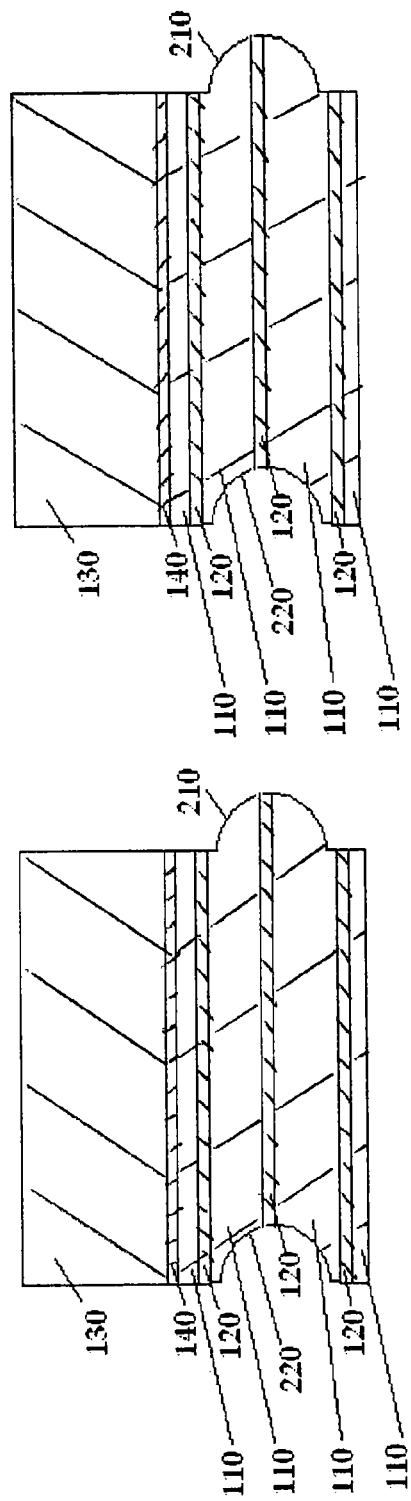

STONE-WOOD COMPOSITE BASE ENGINEERED FLOORING

CROSS-REFERENCE TO RELATED APPLICATION

This application is the U.S. national phase of PCT Appln. No. PCT/US2011/058611 filed on Oct. 31, 2011, which claims the benefit of U.S. Provisional Patent Appln. No. 61/456,110 filed on Nov. 1, 2010, and claims priority to Australian Patent Appln. No. 2010246330 filed on Nov. 19, 2010, the disclosures of which are incorporated in their entirety by reference herein.

TECHNICAL FIELD

The present invention relates to engineered flooring for residential or commercial use, and in particular to a stone—wood composite based engineered flooring wherein the wood veneer layer is resistant to moisture, water and fire.

BACKGROUND

Improved living standards results in increasing consumer demands on interior decoration. At one time the only flooring was simply paving the ground with a layer or slab of cement. Now a wide variety of decorative floor coverings, wood flooring being the most popular, are available. Some flooring despite its wide decorative aesthetics, possess certain undesirable physical properties or characteristics. For instance, natural wood otherwise referred to as "hardwood flooring" is a flammable material susceptible to damage when exposed to moisture and water. Consequently, natural wood flooring provides minimal, if any, waterproof performance, fireproof performance and moisture-proof performance. Yet another disadvantage associated with convention hardwood flooring is that it is typically manufactured with a plywood base construction. Such conventional construction requires preliminary steps to insure a strong bond with the plywood base.

Natural hardwood floorings during installation are adhered directly to the floor (typically a concrete slab) by one of a variety of conventional processes. Generally, a concrete slab, which itself is made from water, takes approximately 18 months for the moisture to evaporate prior to laying the flooring. A concrete slab with soil below always tends to absorb moisture from higher concentration (e.g., higher moisture content in the soil), to lower concentration (e.g., lower moister content in the wood floor or atmosphere in the space where the flooring is being installed). In general, liquid and dampness defuse into natural wood floorings easily, which may result in a change in the internal structure of the natural wood flooring. For example, moisture from the ground or soil when absorbed by the natural wood flooring typically produces a warping such as swelling or "cupping." Consequently, warping of the natural wood flooring damages the flooring structure and overall appearance.

Moreover, conventional hardwood flooring requires a thickness of a ¾ inch or greater. Eco-conscious consumers today are seeking out products that have minimal effect on the environment without having to sacrifice on aesthetic appearance. It would be desirable to design an engineered wood flooring wherein the thickness of the wood required could be reduced thereby minimizing the impact on the environment.

It is therefore desirable to develop an engineered wood flooring that solves the aforementioned problems associated with conventional hardwood flooring.

BRIEF SUMMARY

The present invention is directed to an engineered wood flooring that reduces or minimizes or eliminates the aforementioned disadvantageous associated with conventional hardwood floorings.

One aspect of the present invention is directed to an engineered wood flooring that may be installed on any floor level, including ground floor and subground floor (basement).

Yet another aspect of the present invention is directed to an engineered wood flooring that is environmentally friendly by minimizing the amount of natural resources utilized when compared to hardwood flooring.

The present invention provides a stone-wood composite base that substantially retains the moisture, wetness and heat within the stone-wood composite base away from the wood veneer layer. As a result any undesirable effects on the wood veneer layer due to moisture, wetness and/or heat are minimized. Due to the moisture, wetness and heat retaining properties of the stone-wood composite base, the present inventive engineered wood flooring is particularly well suited for rooms exposed to relatively high heat, wetness, humidity and/or moisture such as bathrooms, kitchens, laundry rooms, mud rooms, greenhouses, sunrooms, etc.

Another aspect of the present inventive stone-wood composite base of the engineered wood flooring is its enhanced sound barrier characteristics in comparison to conventional hardwood flooring.

Unlike conventional natural wood floorings, the present inventive engineered wood flooring does not require any acclimation time, thereby expediting the installation process.

Yet another desirable aspect of the present engineered wood flooring during concrete application, is elimination of the need, cost and time for installation of a subflooring such as a plywood subfloor. Doing away with the subflooring not only saves times while reducing the overall cost, but also eliminates such complications as elevation differentials between adjacent rooms and areas such as hallways.

Still another desirable aspect of the present inventive engineered wood flooring is that it may be installed using conventional wood cutting tools.

One more aspect of the present inventive engineered wood flooring is the ability to manufacture each piece or plank with a tongue-and-groove configuration on preferably at least its two opposite longitudinal sides, most preferably on all exterior edges or sides.

Another aspect of the present inventive engineered wood flooring is the reduced thickness requirements of the natural wood veneer layer without impacting on its aesthetic appearance. The minimum thickness of the veneer wood layer in accordance with the present invention ranges between approximately 2 mm to approximately 6 mm, whereas the minimum thickness of conventional hardwood flooring is ¾ inch or greater. Thus, less trees are required for the same square footage.

An embodiment of the present invention is directed to an engineered wood flooring having a stone-wood composite base in which at least one mesh layer is embedded therein. Adhered to the base layer is a wood veneer layer. Interlocking design such as tongue-and-groove is provided on at least two sides of the engineered flooring. The stone-wood composite base has moisture, wetness and heat retaining properties that along with an adhesive layer at the interface between the base and wood veneer layer substantially isolate the wood veneer layer from moisture, wetness and heat. Accordingly, when the pieces of flooring are bonded to either one another or to the floor, undesired warping of joints due to exposure to moisture, wetness and/or heat is consequently minimized.

Another particular embodiment of the present invention is directed to an engineered wood flooring including a base layer comprising a stone-wood composite including MgO, $MgCl_2$, wood powder, $Fe_2O_3$, $H_3PO_4$, $FeSO_4$. Embedded within the base layer is three fiberglass mesh layers. A wood veneer layer is adhered to the base layer.

BRIEF DESCRIPTION OF THE DRAWINGS

The foregoing and other features of the present invention will be more readily apparent from the following detailed description and drawings of illustrative embodiments of the invention wherein like reference numbers refer to similar elements throughout the several views and in which:

FIG. 1 is a partial cross-sectional view of the various layers of the engineered wood flooring in accordance with the present invention; and FIG. 2 is a cross-sectional view of multiple pieces of the engineered wood flooring in accordance with the present invention illustrating an example complementary tongue-and-groove configuration.

DETAILED DESCRIPTION OF THE DRAWINGS AND THE PRESENTLY PREFERRED EMBODIMENTS

A partial cross-sectional view of the engineered wood flooring 100 in accordance with the present invention is depicted in FIG. 1.

Flooring 100 has a base layer 110 that is a stone-wood composite. Preferably, the stone-wood composite comprises: MgO; wood particles (e.g., shavings, pulp or powder); $MgCl_2$; $Fe_2O_3$; $H_3PO_4$; $FeSO_4$. Base layer 110 absorbs moisture, wetness and/or heat from its environment which is then retained in air pockets formed throughout the base layer. Despite the moisture and wetness retention properties of the base layer its stone crystal composition will never become moldy or acquire a mildew odor. As the temperature and/or environment changes, the base layer releases/absorbs the moisture, wetness and/or heat into/from the surrounding environment. A top wood veneer layer 130 remains substantially unaffected by the moisture, wetness and/or heat since an adhesive layer 140 applied at the interface of the base layer and wood veneer layer acts as an isolator. Therefore, in contrast to conventional hardwood flooring that is made of wood fiber and thus absorbs moisture that can disadvantageously cause the wood to crack or shrink, the stone-wood composite base layer of the present inventive engineered wood flooring absorbs moisture, wetness and/or heat and while remaining substantially isolated from the top wood veneer layer 130 by the adhesive interface 140.

In keeping with the eco-friendly slant of the present invention recycled wood particles are preferred in the base layer 110. The wood particles make the flooring lighter, softer and more flexible. Plastic particles may be used instead of or in addition to wood particles. Embedded in the stone-wood composite base layer 110 is at least one mesh layer 120, preferably made of fiberglass, that during manufacture is immersed in the stone-wood composite base layer while it is still wet. Other mesh materials that would be unaffected when exposed to moisture or wetness may be utilized. Preferably the mesh layer 120 extends all the way to the edges of the flooring. In the embodiments depicted in FIGS. 1 and 2 three mesh layers are depicted: a first mesh layer proximate, but not flush with the bottom surface of the base layer; a second mesh layer substantially centered in the middle of the base layer; and a third mesh layer proximate, but not flush with the top surface of the base layer. The number of mesh layers and their placement within the base layer may be modified, as desired. Varying the number and depth of the mesh layers appropriately will alter the strength and support provided.

Mesh layer 120 has holes defined or formed therein through which the stone-wood composite flows though creating a semi-solid core though and though. Preferably, for ease of manufacture mesh 120 is a simple weave forming holes that are substantially square in shape. Other shape or geometrically configured holes are contemplated and within the intended scope of the present invention. In the case of substantially square shape holes, the dimensions are preferably approximately 3/16 inch X approximately 3/16 inch. Other dimensions may be used, as desired, keeping in mind two competing factors. On the one hand, the size of the holes must be sufficiently large enough to allow the stone-wood composite to pass therethrough. On the other hand, the size of the holes must be small enough to provide sufficient strength and support to the base layer. By way of illustrative example the engineered wood flooring has three mesh layers 120 such as that depicted in FIG. 1 with the following preferred dimensions: overall thickness T4 of the flooring is approximately 20 mm; thickness T3 of the top wood veneer layer 110 is approximately 2 mm; thickness T2 of the base layer is approximately 18 mm; and thickness T1 of each of the mesh layers is preferably approximately 0.9 mm.

As previously mentioned, wood veneer layer 130 is mounted, bonded or adhered to an upper surface of the base layer 110 by an adhesive layer 140. In one embodiment, the adhesive layer 140 is a neoprene base adhesive and the adhered veneers are pressed at room temperature for a predetermined period of time (e.g., approximately 24 hours). In an alternative embodiment, the adhesive layer 140 is a moisture cured urethane based adhesive, and the adhered veneers are pressed at room temperature for a predetermined time (e.g. approximately 2 hours). In keeping with the eco-friendly characteristics of the product, an adhesive with minimal, if any, VOCs is preferred. In addition, the adhesive selected preferably does not contain either water or solvents that could possibly damage the top wood veneer layer. An example adhesive is Magneglue™ manufactured by Stauf Co. Wood veneer layer 130 has a thickness in a range between approximately 2 mm to approximately 6 mm. This range of thickness is considerably less than the 3/4 inch thick required of conventional hardwood flooring having a plywood base thereby minimizing the number of trees needed.

For ease in installation, a complementary interlocking edge is provided in abutting pieces of flooring. By way of illustrative example, a tongue or bump 210 projects from one side of the base layer 110 of the engineered flooring. As depicted in FIG. 2 the tongue and groove do not extend into the wood veneer layer 130. A complementary shaped groove 220 is defined in the opposite side of the base layer 110 of the engineered flooring so that the bump 210 of one piece of engineered wood flooring in accordance with the present invention may be received in the complementary shaped groove 220 of another piece of similar flooring. Preferably, the bump 210 and complementary groove 220 are arranged on at least two parallel sides of the piece of engineered wood flooring, most preferably on all sides to ensure that the flooring remains substantially flat when installed.

Due to the improved stability of the engineered wood flooring in accordance with the present invention no sub-flooring is necessary. Thus, the engineered wood flooring may be "floated" over the floor to be covered by bonding the pieces to one another. In such a floating application, complementary tongue and grooves of abutting pieces of flooring are preferably bonded together with an adhesive at the tongue and groove interfaces. Conventional tongue-and-groove adhesives may be used. If desired, the engineered wood flooring may be floated over existing flooring (e.g., laminate sheets, vinyl tile, ceramic tile, low pile carpeting). Alternatively, the engineered wood flooring may be adhered directly to the floor to be covered using an adhesive such as urethane or polymer based adhesive.

Due to the wetness, moisture and heat retaining properties of the stone-wood composite base layer along with the adhesive layer 140 interface, the wood veneer layer 130 of the present inventive engineered wood flooring has enhanced moisture resistant, water resistant and fire resistant properties compared to conventional hardwood flooring. Moisture and fire resistant testing was conducted on the present inventive flooring with the following results.

Moisture Testing Results

The test method conducted on the present inventive engineered wood flooring was the ASTM D3459 Cycled Environments on Wood. The submitted sample was examined stereoscopically with the appearance digitally recorded. The specimen was then allowed to acclimate in laboratory conditions at 70° F. and 50% relative humidity for 48 hours and subsequently measured. The original length and width measurements were recorded. The specimen was placed in 95% humidity at 100° F. for 48 hours, the sample was removed and immediately re-gauged. The specimen was then exposed to 0% humidity and 120° F. for 48 hours, the sample was removed and immediately re-gauged. This cycle was conducted on one sample with measurements made at each condition. The appearance of the wood layer and wear layer was examined and compared against the original condition. All stages are reported below.

A brief description of the preferred process followed during manufacture of the respective layers comprising the engineered wood flooring in accordance with the present invention is provided below.

The base layer is manufactured in a mold by adding water to the stone-wood composite powder and then mixed completely until substantially uniform. The preferred percentage of each component in the stone-wood composite is as follows:

| | |
|---|---|
| MgO | approximately 40%-approximately 50%, preferably approximately 45% |
| $MgCl_2$ | approximately 20-approximately 45, preferably approximately 42% |
| Wood Powder | approximately 9% |
| Fiber glass mesh | approximately 2.5% |
| $Fe_2O_3$ | approximately 0.5% |
| $H_3PO_4$ | approximately 0.5% |
| $FeSO_4$ | approximately 0.5% |

Preferably, three layers of fiberglass mesh are then embedded into the mixture. The location and positioning of each mesh layer may be modified, as desired, but preferably a first mesh layer is embedded proximate, but not flush with, the bottom surface; a second layer is embedded substantially centered in the middle of the base layer; and a third layer is embedded proximate, but not flush with, the top surface. The water is then drained and the mixture is allowed to set up for a predetermined period of time, preferably approximately 24 hours, while remaining in the mold. The board is then removed from the mold and again allowed to dry for at least approximately 30 days in air. The dried boards may then be cut to size. Top and bottom surfaces of the cut board are then sanded flat until achieving a substantially uniform thickness of approximately 13 mm.

A description of the preparation of the wood veneer layer will now be described. Veneers are measured or rated by the Janka hardness scale and a preferred key hardness number is approximately 1000. Those woods with a Janka harness rating above 1000 use a dry steam process to remove nearly all the moisture form the wood. Too much moisture in the veneer prior to pressing or gluing to the board may result in

| | Original | 1 Cycle Humid | 1 Cycle Dry | 2 Cycles Humid | 2 Cycles Dry | 3 Cycles Humid | 3 Cycles Dry |
|---|---|---|---|---|---|---|---|
| Length (inches) | 11.977 | 12.038 | 12.002 | 12.029 | 12.006 | 12.015 | 12.004 |
| Width (inches) | 4.933 | 4.939 | 4.917 | 4.936 | 4.921 | 4.948 | 4.931 |
| Thickness (inches) | 0.600 | 0.621 | 0.612 | 0.624 | 0.615 | 0.623 | 0.608 |
| Weight (grams) | 735.91 | 743.65 | 721.93 | 739.12 | 728.05 | 761.58 | 736.91 |

Significant face cracking was observed, but no ply separation or planar changes.

Fire Resistant Testing Results

The test method conducted on the present inventive engineered wood flooring was

Test Requirements: GB 8624-1997 <<Classification on burning behavior for building materials>>

Test Items: Critical Radiant Flux Test

Test Summary: In accordance with GB 8624-1997 Standards (surfaces combustion performance B1 grade) requirements cracking or wood veneer failure. Extensive veneer moisture control is preferred with the base layer for proper production of the engineered wood flooring.

The steps taken in preparing the wood veneer layer depends on the Janka rating. Veneers with a Janka rating over 1000 will be discussed first. With those veneers having a standard dry kiln moisture content of approximately 10% to approximately 13%, the moisture is removed by a dry steam process. Each wood differs as far as time in this steam oven but the purpose of this dry steam process is to reduce the moisture content to a range between approximately 3% to approximately 5%. Usually, the wood is subjected to the dry steam for approximately 10 days to approximately 14 days. The dried veneers are then wrapped in plastic and remain stored in a dehumidification dry room.

For those veneers with a Janka rating below 1000. Those veneer with the kiln dry standard dryness of approximately 10% to approximately 13% are placed in a dehumidification room until the moisture in the veneers is reduced to approximately 6% to approximately 8%.

Regardless of the Janka rating, once the appropriate moisture content range is achieved, the veneer is adhered to the base layer and pressed at room temperature for predetermined period of time. In one embodiment, the veneer is adhered to the base layer using a neoprene adhesive and pressed at room temperature for 24 hours. In another embodiment, the veneer is adhered to the base layer using a moisture cured urethane adhesive and pressed at room temperature for 2 hours. Once the veneers are pressed the process is exactly the same.

Pressed boards warp or bend in the long direction due to such factors as dryness in veneer and the board pulling on the base layer. To minimize or eliminate such warping the pressed boards are returned to the drying room for approximately 4 days to allow the moisture to substantially equalize from base to veneer and/or until the boards become substantially flat naturally. Once removed from the drying room, the surfaces of the board are substantially uniformly sanded. Thereafter, the boards are cut to form the complementary tongue-and-groove. Then, the boards are once again returned to the dehumidification room for approximately 24 hours and then removed for final sanding and finish. At this point in time the finished boards may be packaged and shipped ready to be installed.

To install the flooring, the floor to which the flooring is to cover should be clean, dry, substantially smooth and substantially flat. As previous noted, the engineered wood flooring in accordance with the present invention does not need to be acclimated to the environment. Adhesive is applied with a tool or instrument that has been recommended by its manufacturer to an exposed surface of the floor to be covered with the engineered wood flooring. Typically, the adhesive is applied using a conventional notch trowel. Each piece of engineered wood flooring is lay out over the applied adhesive while firmly pushing the interlocked tongue-and-grooves together in a preferably random pattern, most preferably the short joints are disposed no closer than approximately 6 inches apart from one another. The pieces of engineered wood flooring are cut to size using conventional cutting tools (e.g., chop saw, table saw) and conventional cutting blades. In the case of a floating floor, the adhesive is applied on the exposed surface of the tongue and groove, rather than the floor to be covered.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps that perform substantially the same function, in substantially the same way, to achieve the same results be within the scope of the invention. Substitutions of elements from one described embodiment to another are also fully intended and contemplated. It, is also to be understood that the drawings are not necessarily drawn to scale, but that they are merely conceptual in nature. It is the intention, therefore, to be limited only as indicated by the scope of the claims appended hereto.

Every issued patent, pending patent application, publication, journal article, book or any other reference cited herein is each incorporated by reference in their entirety.

The invention claimed is:

1. A wood flooring comprising:
   a composite base layer;
   at least one mesh layer embedded within the composite base layer, and
   a wood veneer layer coupled to the composite base layer;
   wherein the composite base layer consists essentially of approximately 40% to approximately 50% MgO, approximately 20% to approximately 45% $MgCl_2$, approximately 9% wood powder, approximately 2.5% fiberglass mesh, approximately 0.5% $Fe_2O_3$, approximately 0.5% $H_3PO_4$, and approximately 0.5% $FeSO_4$.

2. The wood flooring of claim 1, wherein the wood veneer layer is adhered to a top surface of the composite base layer.

3. The wood flooring of claim 1, wherein the at least one mesh layer is comprised of fiberglass.

4. The wood flooring of claim 1, wherein the composite base layer comprises approximately 45% MgO.

5. The wood flooring of claim 1, further comprising a second mesh layer and a third mesh layer.

6. The wood flooring of claim 5, where a first mesh layer is embedded adjacent to a bottom surface of the composite base layer; the second mesh layer is embedded substantially centered in the middle of the composite base layer; and the third mesh layer is embedded adjacent to a top surface of the composite base layer.

7. The wood flooring of claim 6, wherein the first mesh layer is not flush with the bottom surface of the composite base layer and the third mesh layer is not flush with the top surface of the composite base layer.

8. The wood flooring of claim 1, wherein the composite base layer comprises recycled wood particles.

9. The wood flooring of claim 1, wherein the composite base layer comprises plastic particles.

10. The wood flooring of claim 1, wherein the at least one mesh layer extends to edges of the composite base layer.

11. The wood flooring of claim 1, wherein the composite base layer includes air pockets configured to substantially retain moisture, wetness, and heat.

12. The wood flooring of claim 1, wherein the at least one mesh layer comprises a simple weave forming holes, the holes being sufficiently large enough to allow the composite base layer to flow through.

13. The wood flooring of claim 1, further comprising interlocking edges disposed on at least two opposing sides of the composite base layer.

14. The wood flooring of claim 13, wherein the interlocking edges comprise a tongue on a first side of the composite base layer and a groove on a second side of the composite base layer, the tongue and groove configured to connect an adjacent piece of the wood flooring.

15. The wood flooring of claim 1, wherein an adhesive layer is disposed between the wood veneer layer and a top surface of the composite base layer.

16. The wood flooring of claim 15, wherein the adhesive layer is a neoprene base adhesive substantially free of water and solvents.

17. The wood flooring of claim 15, wherein the adhesive layer is a moisture cured urethane adhesive.

18. The wood flooring of claim 1, wherein an overall thickness of the wood veneer layer is approximately 2 mm;

the thickness of the composite base layer is approximately 18 mm, and the thickness of the at least one mesh layer is approximately 0.9 mm.

19. A wood flooring comprising:
a composite base layer,
at least one mesh layer embedded within the composite base layer, and
a wood veneer layer coupled to the composite base layer,
wherein the composite base layer comprises approximately 40% to approximately 50% MgO, approximately 42% $MgCl_2$, approximately 9% wood powder, approximately 2.5% fiberglass mesh, approximately 0.5% $Fe_2O_3$, approximately 0.5% $H_3PO_4$, and approximately 0.5% $FeSO_4$.

20. The wood flooring of claim 19, wherein the wood veneer layer is adhered to a top surface of the composite base layer.

21. The wood flooring of claim 19, wherein that at least one mesh layer is comprised of fiberglass.

22. A method for manufacturing a wood flooring comprising the steps of:
adhering and pressing a composite base layer and a wood veneer layer to form a board;
sanding surfaces of the board uniformly;
cutting the board to form locking edges disposed on a first side and a second side of the board;
dehumidifying the board for approximately 24 hours;
sanding and finishing the board,
wherein the composite base layer comprises at least one mesh layer embedded within the composite base layer and wherein the composite base layer consists essentially of approximately 40% to approximately 50% MgO, approximately 20% to approximately 45% $MgCl_2$, approximately 9% wood powder, approximately 2.5% fiberglass mesh, approximately 0.5% $Fe_2O_3$, approximately 0.5% $H_3PO_4$, and approximately 0.5% $FeSO_4$.

23. The method of claim 22, wherein the composite base layer is prepared by the following steps:
mixing water with a composite powder in a mold to form a mixture, the composite powder comprising MgO, $MgCl_2$, the wood powder, the fiberglass mesh, $Fe_2O_3$, $H_3PO_4$, and $FeSO_4$;
embedding the at least one mesh layer into the mixture;
draining the water from the mixture;
setting the mixture for a predetermined period of time to form a composite board;
drying the composite board for a predetermined period of time;
cutting the composite board to a predetermined size; and
sanding a top surface and a bottom surface of the composite board.

24. The method of claim 22, wherein the veneer layer is prepared by the following steps:
drying a wood veneer having a Janka rating greater than 1000 to a moisture content ranging between approximately 3% to approximately 5%;
wrapping the wood veneer in plastic; and
dehumidifying the wood veneer.

25. The method of claim 22, wherein the wood veneer layer is prepared by dehumidifying a wood veneer having a Janka rating less than 1000 to a moisture content ranging between approximately 6% to approximately 8%.

26. The method of claim 22, wherein the composite base layer and the wood veneer layer are coupled using a neoprene adhesive.

27. The method of claim 26, wherein the adhering and pressing step further comprises:
pressing the composite base layer and the wood veneer layer for a period of 24 hours to form a pressed board, and
drying the pressed board for approximately four days.

28. The method of claim 22, wherein the composite base layer and the wood veneer layer are coupled using a moisture cured urethane adhesive.

29. The method of claim 28, wherein the adhering and pressing step further comprises:
pressing the composite base layer and the wood veneer layer for a period of 2 hours to form a pressed board, and
drying the pressed board for approximately four days.

* * * * *